(12) United States Patent
Maggenti et al.

(10) Patent No.: US 9,137,346 B2
(45) Date of Patent: *Sep. 15, 2015

(54) SYSTEM AND METHOD FOR PERMITTING RECORDATION OF VOICE TRANSMISSIONS AMONG GROUP MEMBERS OF A COMMUNICATION GROUP OF WIRELESS COMMUNICATION DEVICES

(71) Applicant: QUALCOMM Incorporated, San Diego, CA (US)

(72) Inventors: Mark A. Maggenti, San Diego, CA (US); Kulathumani Krishnan, Fremont, CA (US); Mohammed Ataur R. Shuman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 200 days.

This patent is subject to a terminal disclaimer.

(21) Appl. No.: 13/760,838

(22) Filed: Feb. 6, 2013

(65) Prior Publication Data

US 2013/0150115 A1 Jun. 13, 2013

Related U.S. Application Data

(63) Continuation-in-part of application No. 13/472,045, filed on May 15, 2012, now Pat. No. 8,738,059, which is a continuation of application No. 12/486,886, filed on Jun. 18, 2009, now Pat. No. 8,195,213.

(51) Int. Cl.
*H04W 4/10* (2009.01)
*H04M 1/656* (2006.01)
(Continued)

(52) U.S. Cl.
CPC ......... *H04M 1/656* (2013.01); *H04L 29/06442* (2013.01); *H04L 65/4061* (2013.01);
(Continued)

(58) Field of Classification Search
CPC ........................... H04M 1/656; H04M 3/42221
USPC ................. 455/518, 517, 466, 416, 411, 418, 455/67.11, 519, 520
See application file for complete search history.

(56) References Cited

U.S. PATENT DOCUMENTS 7,730,506 B1 6/2010 Lyda
8,195,213 B2 6/2012 Maggenti et al.
(Continued)

FOREIGN PATENT DOCUMENTS

CN 1658689 A 8/2005
EP 1677552 A1 7/2006
(Continued)

OTHER PUBLICATIONS

Miyazaki A., et al., "RTP Payload Formats to Enable Multiple Selective Retransmissions; draft-ietf-avt-rtp-selret-05.txt", Jun. 1, 2002, vol. avt, No. 5, Jun. 1, 2002, XP015001419, p. 5-p. 11, p. 15-p. 18, p. 25-p. 27.
(Continued)

*Primary Examiner* — John J Lee
(74) *Attorney, Agent, or Firm* — Raphael Freiwirth

(57) ABSTRACT

The disclosure is directed to recording voice data transmissions between mobile communication devices. An embodiment of the disclosure receives, at a first mobile communication device, an indication that a subsequent voice transmission segment may or may not be recorded by at least one other mobile communication device, and transmits, from the first mobile communication device, an indication to said at least one other mobile communication device that the subsequent voice transmission segment may or may not be recorded. Another embodiment receives an indication from at least one other mobile communication device that a subsequent voice transmission segment may or may not be recorded by said mobile communication device, and if the received indication indicates that the subsequent voice transmission segment may be recorded, records at least a portion of the subsequent voice transmission segment, and stores the recorded portion in a memory associated with said mobile communication device.

57 Claims, 8 Drawing Sheets

(51) Int. Cl.
*H04M 3/42* (2006.01)
*H04L 29/06* (2006.01)

(52) U.S. Cl.
CPC ............ *H04M3/42221* (2013.01); *H04W 4/10* (2013.01); *H04M 2203/258* (2013.01); *H04M 2207/18* (2013.01)

(56) References Cited

U.S. PATENT DOCUMENTS

| | | |
|---|---|---|
| 2003/0223381 A1 | 12/2003 | Schroderus |
| 2005/0215273 A1 | 9/2005 | Ito |
| 2006/0040690 A1 | 2/2006 | Lee et al. |
| 2006/0171351 A1 | 8/2006 | Wild et al. |
| 2007/0021131 A1 | 1/2007 | Laumen et al. |
| 2007/0155415 A1* | 7/2007 | Sheehy et al. ............ 455/518 |
| 2007/0214217 A1 | 9/2007 | Ueno et al. |
| 2007/0280256 A1 | 12/2007 | Forslow |
| 2008/0076391 A1* | 3/2008 | Chen et al. ............... 455/411 |
| 2008/0153501 A1 | 6/2008 | Harris et al. |
| 2009/0125476 A1 | 5/2009 | Jager et al. |
| 2009/0233596 A1 | 9/2009 | Calabrese |
| 2009/0298477 A1 | 12/2009 | Iio |
| 2010/0048235 A1 | 2/2010 | Dai et al. |
| 2010/0273516 A1 | 10/2010 | Sung et al. |
| 2011/0065462 A1* | 3/2011 | Larocca ..................... 455/466 |
| 2012/0117153 A1 | 5/2012 | Gunasekar et al. |
| 2012/0322421 A1 | 12/2012 | Maggenti et al. |
| 2013/0115995 A1 | 5/2013 | Miller et al. |
| 2013/0196706 A1 | 8/2013 | Patel et al. |
| 2013/0235767 A1 | 9/2013 | Schwagmann et al. |
| 2014/0113672 A1 | 4/2014 | Linder |

FOREIGN PATENT DOCUMENTS

| | | |
|---|---|---|
| GB | 2412041 A | 9/2005 |
| JP | 2005234666 A | 9/2005 |
| JP | 2007104118 A | 4/2007 |
| JP | 2007116735 A | 5/2007 |
| JP | 2007527672 A | 9/2007 |
| JP | 2007274499 A | 10/2007 |
| JP | 2007528672 A | 10/2007 |
| JP | 2008085903 A | 4/2008 |
| JP | 2008104118 A | 5/2008 |
| JP | 2008258844 A | 10/2008 |
| WO | 2005086508 | 9/2005 |

OTHER PUBLICATIONS

International Search Report and Written Opinion—PCT/US2013/040458—ISA/EPO—Aug. 9, 2013.

* cited by examiner

SYSTEM AND METHOD FOR PERMITTING RECORDATION OF VOICE TRANSMISSIONS AMONG GROUP MEMBERS OF A COMMUNICATION GROUP OF WIRELESS COMMUNICATION DEVICES

PRIORITY

This application is a continuation-in-part of U.S. application Ser. No. 13/472,045, titled "SYSTEM AND METHOD FOR PERMITTING RECORDATION OF VOICE TRANSMISSIONS AMONG GROUP MEMBERS OF A COMMUNICATION GROUP OF WIRELESS COMMUNICATION DEVICES," filed May 15, 2012, now U.S. Pat. No. 8,738,059 and assigned to QUALCOMM INCORPORATED, which is a continuation of U.S. application Ser. No. 12/486,886, titled "SYSTEM AND METHOD FOR PERMITTING RECORDATION OF VOICE TRANSMISSIONS AMONG GROUP MEMBERS OF A COMMUNICATION GROUP OF WIRELESS COMMUNICATION DEVICES," filed Jun. 18, 2009, now U.S. Pat. No. 8,195,213 and assigned to QUALCOMM INCORPORATED.

BACKGROUND OF THE INVENTION

1. Field of the Invention

The present invention relates to point-to-point or point-to-multipoint wireless communications systems. More specifically, the present invention relates to systems and methods for recording voice transmissions between members of a communicating group of wireless telecommunication devices.

2. Description of the Related Art

In wireless telecommunication devices, such as cellular phones, PDAs, mini-laptops, and advanced pagers, there exists a wireless telecommunication service that provides a quick one-to-one or one-to-many communication that is generically referred to as "Push-To-Talk" (PTT) capability. The specific PTT group of recipient devices for the communicating wireless device is commonly set up by the carrier. A PTT communication connection is typically initiated by a single button-push on the wireless device that activates a half-duplex link between the speaker and each member device of the group and once the button is released, the device can receive incoming PTT transmissions once the button is released. In some arrangements, the PTT speaker will have the "floor" where no other group member can speak while the speaker is speaking. Once the speaker releases the PTT button, any other individual member of the group can engage their PTT button and they will have the floor.

In many cases it would be desirable for members of a PTT group to record part or all of a PTT session. For example, it may be more convenient for members to record important details of a session by recording the session rather than writing down the salient details during the course of a conversation. In many cases it may not be possible for a member to write, for example if the member is engaged in other activities. In existing PTT systems, however, it is difficult or not possible to record parts of a communication session. Furthermore, if a participant needs to exit a PTT session, the participant must later contact one of the other participants to review the content of the session.

In other cases, voice communications may only be recorded via a voice messaging system. Such as system requires intervention by a centrally available voice messaging system. Visual voice mail requires a server for the user to pull down a file. The voice mail messages must be recorded and saved to the server.

Accordingly, it would be advantageous to provide a system and method that may obtain the desired permissions to record part or all of a PTT session and for a wireless device member of a group the session to record the session. It would further be advantageous for the session to be recorded and stored locally such that a centrally accessible server is not required.

SUMMARY OF THE INVENTION

Briefly described, the present invention includes a system, method, computer readable product, and wireless communication device that allows a member of a PTT group to receive indications from at least one other mobile communication device that a current conversation or talk spurt may be recorded. The member may further record or receive the recorded conversation or talk spurt on the device, and store the recorded conversation or spurt in a local memory for later retrieval or automatic playback.

In one embodiment, a member of a PTT group ("talker") may indicate that the next talk spurt is available for saving by other members of the PTT group ("targets") by pressing the PTT button. The talker may continue to speak to the PTT group, including content comprising information that may be desirable for recording. The target devices may hear the PTT voice in real time as normally heard, and may further be presented the option of recording or saving the talk spurt for later playback as a voice "sticky note." Optionally, the voice sticky note may be allowed to be forwarded to other PTT users or internet portals and stored on a server.

In a further embodiment, the method for recording a talk spurt may further include implicit or explicit permission to record the talk spurt. By having the talker mark a talk spurt as allowable to be saved, the talker may provide implied permission to record the talk spurt.

In a further embodiment, a verbal PTT conversation can be displayed as a "chunk" of spoken audio in a timeline (with time stamp). Such visualization can have all PTT audio displayed in a chronological order and differentiates audio from each speaker by attributes, such as color or positioning, or the combination of several methods. The PTT user is then able to click on an audio "chunk" to replay and or archive an entire conversational exchange on the PTT system where that user is a participant.

In a further embodiment, voice data transmissions between mobile communication devices may be recorded. An embodiment receives, at a first mobile communication device, an indication that a subsequent voice transmission segment may or may not be recorded by at least one other mobile communication device, and transmits, from the first mobile communication device, an indication to said at least one other mobile communication device that the subsequent voice transmission segment may or may not be recorded. Another embodiment receives an indication from at least one other mobile communication device that a subsequent voice transmission segment may or may not be recorded by said mobile communication device, and if the received indication indicates that the subsequent voice transmission segment may be recorded, records at least a portion of the subsequent voice transmission segment, and stores the recorded portion in a memory associated with said mobile communication device.

The present system and method are therefore advantageous in that a centrally accessible server is not required to implement the sticky voice note. Members of a PTT group may thus save important information that the talker is speaking (e.g., phone numbers, directions, account numbers, etc.) for later playback. Targets may hear the talker's voice as it is being recorded, and the resulting voice sticky note may be available locally without being stored and forwarded.

Other objects, features, and advantages of the present invention will become apparent after review of the Brief Description of the Drawings, Detailed Description of the Invention, and the Claims.

DETAILED DESCRIPTION OF THE INVENTION

In this description, the terms "mobile communication device," "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The term "exemplary" means that the disclosed element or embodiment is only an example, and does not indicate any preference of user. The term "group communication" means point-to-point or point-to-multipoint communication effected in a real or virtual half-duplex communication. Further, like numerals refer to like elements throughout the several views, and the articles "a" and "the" includes plural references, unless otherwise specified in the description.

Figure 1:
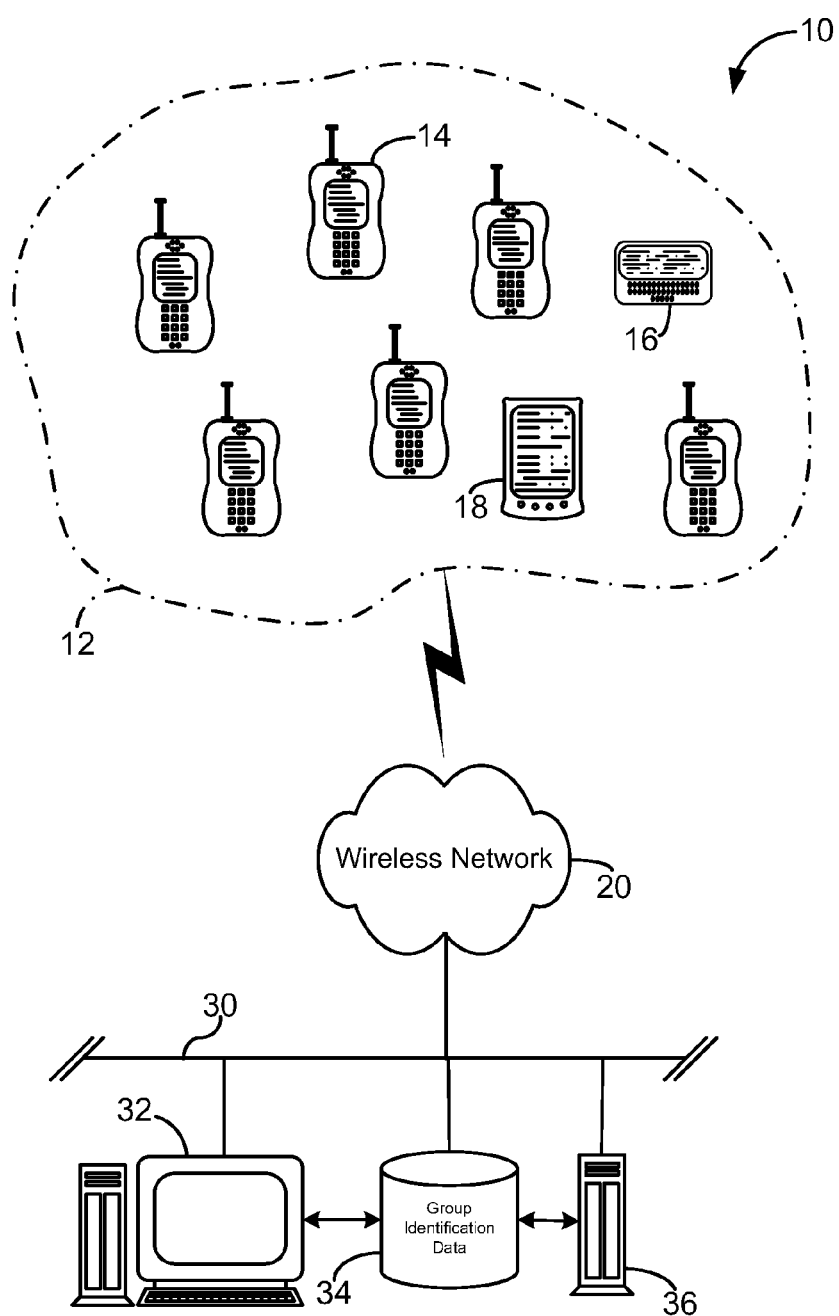
FIG. 1 is a representative diagram of a wireless network with a designated PTT group of wireless telecommunication devices communicating with a group communication server and other computer devices across the wireless network.

With reference to the figures in which like numerals represent like elements throughout, FIG. 1 illustrates one embodiment of the system 10 for sharing group media among one or more wireless telecommunication devices in a PTT group 12, such as the wireless telephone 14, smart pager 16 and personal digital assistant (PDA) 18, with other wireless telecommunication devices across a wireless network 20. In the system 10, each wireless telecommunication device 14,16,18 is capable of selectively directly communicating across the wireless communication network 20 with a target set of one or more other wireless telecommunication devices of the plurality. For example, the target set for mobile telephone 14 can be all devices in the communication group 12 or a subset thereof, such as pager 16 and PDA 18.

In this embodiment, the wireless telecommunication device (such as mobile telephone 14) sends a flag to at least the group communication computer device, shown here as server 32, which is present on a server-side LAN 30 across the wireless network 20, to indicate that the wireless device is present, i.e. accessible, on the wireless network 20. The group communication computer device 32 can share this information with the set of target wireless telecommunication devices designated by the first wireless telecommunication device, or can also share is with other computer devices resident on the server-side LAN 30 or accessible across the wireless network 20. The group communication computer device 32 can have an attached or accessible database 34 to store the group identification data for the wireless devices. A data store 36, shown here as file management server, is also present on the server-side LAN 30. It should be appreciated that the number of computer components resident on server-side LAN 30, or across the wireless network 20, or Internet generally, are not limited.

The direct communication, such as a PTT communication, can be established through a half-duplex channel (true or virtual, i.e. a full-duplex channel is open but the device only broadcasts and receives in half-duplex mode) between the communicating wireless telecommunication device 14,16,18 and the one or more other wireless telecommunication devices of the target set. Also, the group communication computer device 32 can attempt to bridge the requested direct communication with the target set if at least one of the wireless telecommunication devices of the target set have informed the group communication computer device 32 of their presence on the wireless network 20.

The group communication computer device 32 can also inform the wireless telecommunication device 14,16,18 of the inability to bridge a direct communication to the target set 12 upon none of the wireless telecommunication devices (or at least one) of the target set not having informed the group communication computer device 32 of their presence on the wireless network 20. Further, while the group communication computer device 32 is shown here as having the attached database 34 of group identification data, the group communication computer device 32 can have group identity data resident thereupon, and perform all storage functions described herein.

In overview, the system 10 includes at least one wireless communication device, such as mobile telephone 14, that is a member of a communication group 12 of wireless communication devices that communicate with each other in direct group communications across a wireless communication network 20, the at least one wireless communication device configured to selectively send group-directed media to other members of the communication group 12. At least one group communication computer device 32 is configured to store information on communication groups 12 on the wireless communication network 20, the information including the identity of the specific member wireless communication devices of one or more communication groups. The group communication computer device 32 is further configured to selectively receive group-directed media from a sending wireless communication device, such as mobile telephone 14, of a communication group 12 and send the group-directed media to the other member wireless communication devices of the communication group 12 for the sending wireless communication device.

The system 10 can further include a data store 36 in communication with the group communication computer device(s) 32, with the group communication computer device 32 configured to send group-directed media to the data store 36, as is further described herein. The data store 36 configured to receive the group-designated media from the wireless communication device (such as mobile phone 14) and selectively permit members of the communication group 12 for which the group-directed media was sent to access the stored group-directed media across the wireless communication network 20.

The group-directed media can be graphic media, such as pictures in JPEG, TIF, and the like, audio files such as MP3, MP4, WAV, and the like. The media can also be streaming media, such as a multimedia application (Powerpoint, MOV file, and the like). The group-directed media can also be streaming media, or an interactive session on another computer device on the wireless communication network 20, such as a game hosted on data store 36 or private bulletin board. For example, participants in a game can chat via the group-communication about the ongoing game. Also, the group-directed media could be half-duplex video conferencing among members of the communication group wherein the picture of the speaker is broadcast to the other group members in substantial real-time, or in delay.

The size of these media files can be very large, and because of the potential delay of sending the media, or inability of the receiving wireless communication device to handle the sent media, the system 10 can use a data store 36 (or file management server or other computer device) to store the group-directed media such that target members of the communication group 12 can selectively access the stored media without interrupting other PTT communications. The data store 36 can be configured to automatically send the group-directed media to each of the member wireless devices of the communication group 12 upon establishing a communication link therewith. Alternatively, in one embodiment, if the group-directed media is stored at the data store 36, the group communication computer device 32 or the data store 36 can send a hyperlink to the other member wireless communication devices of the communication group 12, that will provides a link to the stored group-directed media at the data store 36. Upon receipt of the group-directed media by at least one of the member wireless devices of the communication group, the group communication computer device 32 can send to the wireless communication device 14,16,18 sending the group-directed media an acknowledgement that at least one member wireless communication device of the communication group 12 received the group-directed media.

The wireless communication device 14,16,18 can send communication group identification data to the group communication computer device 32 at the time of requesting the group-directed media to be sent, e.g. send a target list, and thus, the group communication device 32 will send or store the group-directed media to the member wireless communication devices identified in the communication group identification data based upon a variety of criteria as is further discussed herein. Alternately, prior to the wireless communication device sending group-directed media, the wireless communication device 14,16,18 can request member data for a communication group 12 from the group communication computer device 32, and the group communication computer device 32 can send one or more addresses or communication group addresses to the wireless communication device 14,16, 18. In one embodiment, the communication group computer device 32 can filter the potential communication groups available.

As is further described herein, the wireless communication device 14,16,18 can be engaged in a group communication with the member wireless communication devices of the communication group 12 and send group-directed media during the group communication in the same communication session, or independently therefrom. Alternately, the group-directed media can be sent independently of the group-communication session.

Figure 2:
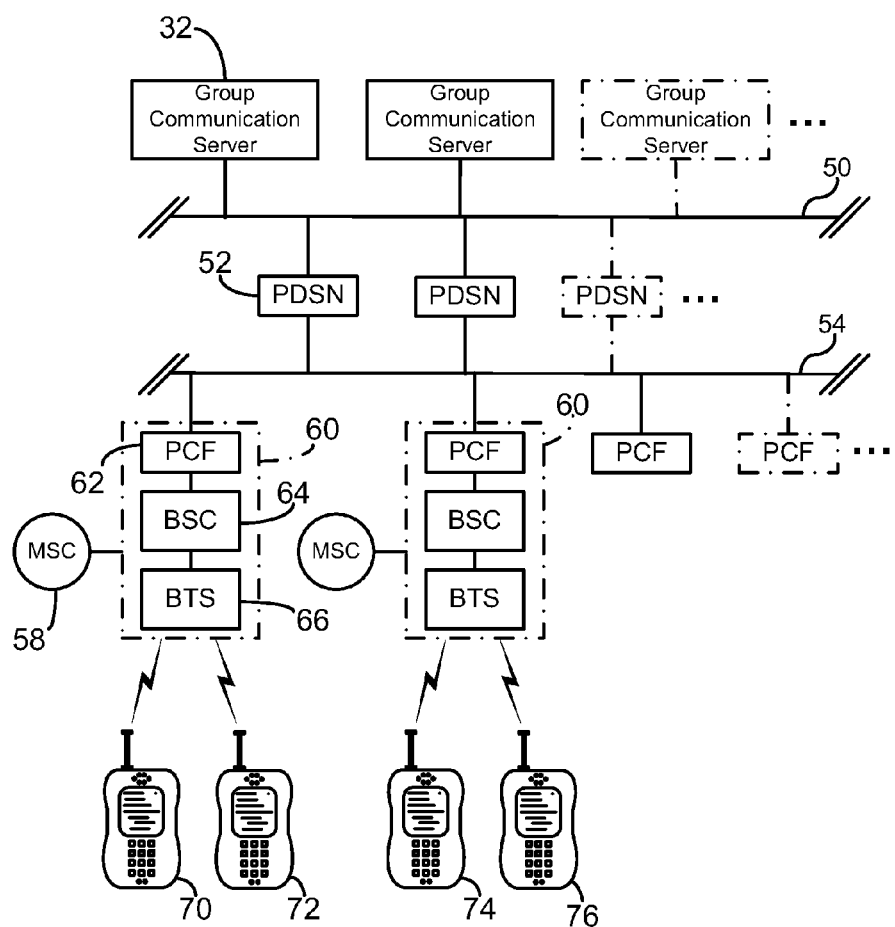
FIG. 2 is a representative diagram of one embodiment of a wireless network in a common cellular telecommunication configuration, having a group communication server control communications between the wireless telecommunication devices of PTT group members.

FIG. 2 is a representative diagram of one embodiment of a wireless network in a common cellular telecommunication configuration, having a series of group communication computer devices (group communication servers) 32 that control communications between the wireless communication devices of set group members (devices 70,72,74,76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions from the group communication server(s) 32 using a data service option.

The group communication server(s) 32 are connected to a wireless service provider's packet data service node (PDSN) such as PDSN 52, shown here resident on a carrier network 54. Each PDSN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 30 communicates with the MSC 58 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art. It should also be noted that carrier boundaries and/or PTT operator network boundaries do not inhibit or prohibit the sharing of data as described herein.

Cellular telephones and mobile telecommunication devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and data. In wireless devices that have designated a communication group 12 (FIG. 1), the wireless communication device can directly connect with the other member of the set and engage in voice and data communication. However, all such direct group communications will occur through, or at the control of, the group communication computer device 32. All data packets of the devices do not necessarily have to travel through the group communication computer device 32 itself, but the group communication computer device 32 must be able to ultimately control the communication because it will typically be the only server-side 30 component that is aware of and/or can retrieve the identity of the members of the communication group, or direct the identity of the members of the communication group 12 to another computer device.

Figure 3:
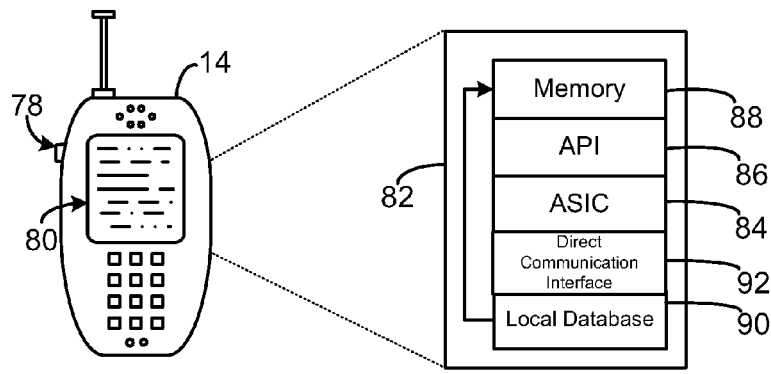
FIG. 3 is a block diagram illustrating the computer platform of the wireless telecommunication device with PTT capability.

FIG. 3 is a block diagram illustrating one embodiment of the wireless telecommunication device being a mobile telephone 14 with a PTT button 78 that opens the direct group communication to a target set of devices, i.e. other members of the communication group 12. The wireless device 14 is also shown as having a graphics display 80 to the user of the wireless device 14. The wireless device 14 includes a computer platform 82 that can handle voice and data packets, and receive and execute software applications transmitted across the wireless network 20 to include the group-directed media. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by QUALCOMM® for wireless device platforms.

As shown here, the wireless device can be a mobile telephone 14, with a graphics display 80, but can also be any wireless device with a computer platform 82 as known in the art, such as a personal digital assistant (PDA), a pager with a graphics display 80, or even a separate computer platform 82 that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk. The graphics display 80 can present not only information about the ongoing group call, but also the information on the group-directed media, to include a file preview as is more fully described herein.

In this embodiment of the wireless device, the computer platform 82 also includes a direct communication interface 92 that can open the direct communication channel from the wireless device. The direct communication interface 92 can also be part of the standard communication interface for the wireless device which ordinarily carries the voice and data transmitted to and from the wireless device. The direct communication interface 92 typically is comprised of hardware as is known in the art.

Figure 4:
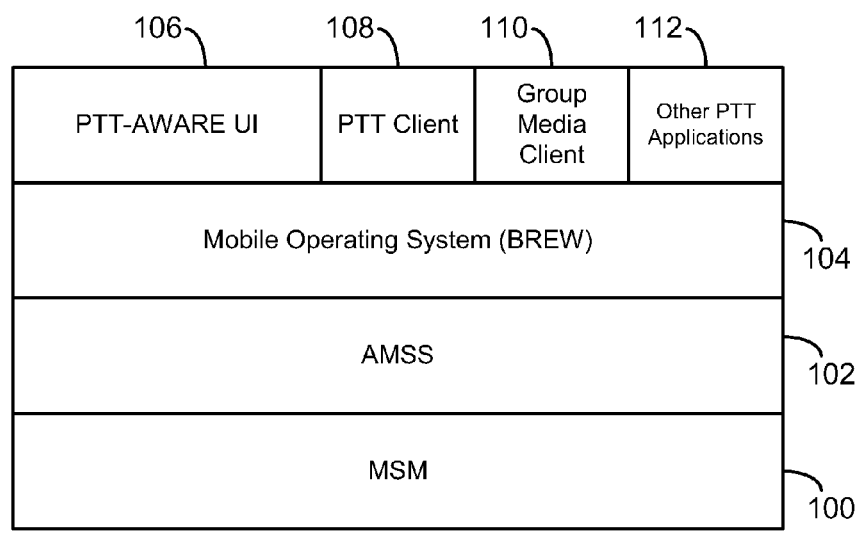
FIG. 4 is a diagram of one embodiment of the software layers of the communication group application resident on the computer platform of the mobile communications device, with a PTT client and a group-directed media client.

FIG. 4 is a diagram of one embodiment of the software layers of the group application client, with a PTT facility and a group-directed media facility. In this embodiment, the computer platform 82 in the mobile device environment consists of a series of software "layers" developed on top of the Mobile Station Modem (MSM) 100 and the Advanced Mobile Subscriber Software (AMSS) 102, developed by QUALCOMM, drives the underlying MSM chipset and implements the software protocol stack for the entire suite of CDMA communication technologies that include CDMA2000 1X and CDMA2000 1xEV-DO. There is a mobile operating system layer 104, which in this embodiment is BREW®, also developed by QUALCOMM. The mobile operating system layer 104 application programming interfaces for chip or device-specific operations, while providing an isolation layer that eliminates direct contact to the AMSS 100 and any OEM software on the computer platform. The mobile operating system layer 104 enables application development that uses mobile device features without having to rewrite the application each time a new release of the device-specific software is released.

The PTT Client 108 is an application that offers access to PTT services through an external interface, here shown at a PTT-aware UI 106. The PTT Client includes all the functions required to enable mobile operating system 104 applications, such as the Group Media Client 110. In addition to providing access to PTT services with the PTT Client 108, the PTT Client 108 preferably acts as an isolation layer between all PTT-aware applications and the interface to the group communication computer device 102. In this embodiment, the PTT Client 108 maintains access to PTT services, responds to group communication requests, processes all PTT-aware mobile operating system applications requests for PTT services, processes all outgoing PTT requests, collects and packages vocoder packets for originating PTT talk spurts, and parses packets of vocoder data for terminated PTT talk spurts.

The Group Media Client 110 is a mobile operating system-based application that extends PTT services for access to media types other than the traditional half duplex voice communications (VoIP-PTT media). The Group Media Client 110 provides access to group-media services through an external interface, in one embodiment being a separate API, such as a Group Media Aware API. The Group Media Aware UI is an application that may be developed entirely as a mobile operating system-based application or used in combination with an AMSS 102 interface. The Group Media Aware UI responds to user requests for group-directed media services by invoking the appropriate APIs, such as those from other resident PTT and group media applications 112. The Group Media Client 110 services the requests from the user and informs the user the result of any group-directed media request. The user can also have settings on the Group Media Client 110 that specify how to handle an incoming notification that indicates there is a file to be downloaded from the file management server (data store 36). For example, the Group Media Client 110 can elect to have the file download commence immediately or to allow the target user to be prompted to determine whether to download the file.

Figure 5:
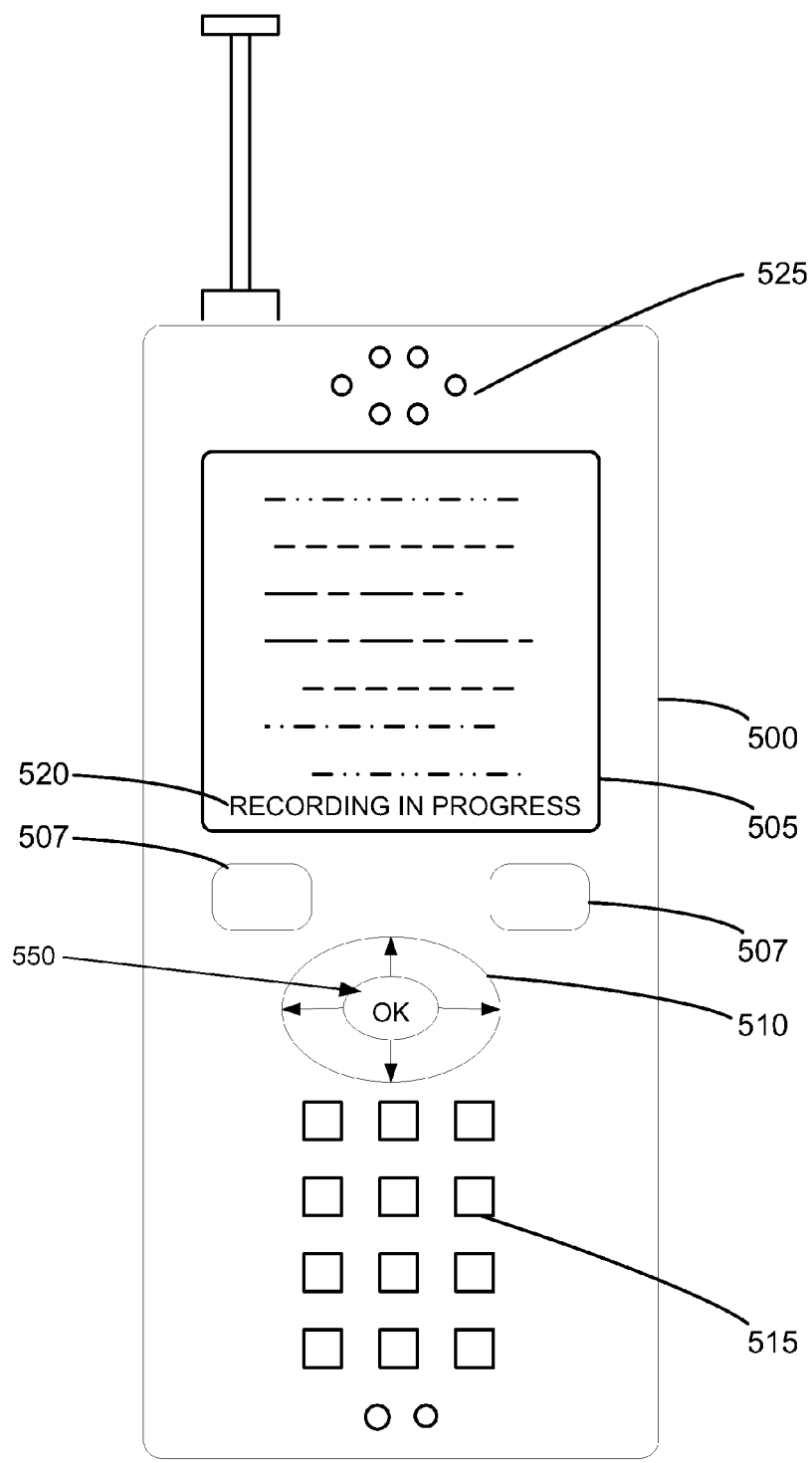
FIG. 5 is an exemplary mobile communications device.

Referring to FIG. 5, illustrated is an exemplary mobile communication device 500, and in particular, the user interface for the device. The device typically includes a display 505 that may comprise an LCD or OLED display. In some embodiments, the display may include touch screen capability. The device may include a keypad 515 that may be a standard phone keypad, or in other embodiments a QWERTY keypad. The device may also include navigation buttons 510 that may further comprise up, down, left, and right keys for navigating through the display 505. The navigation keys may further comprise a selection or OK key 550 to indicate the user's selection or acknowledgment of a particular function. The device may also include soft keys 507 that are programmable and used to select the function as indicated in an area of display 505 near the soft key.

As discussed above, during the time that a talk spurt is being recorded, the device may provide indication that a recording is taking place. Referring to FIG. 5, in one embodiment the device may illuminate one or more buttons from keypad 515, navigation buttons 510, or OK key 550. The button(s) may illuminate steady in a particular color, or may flash on/off, or in any other manner as configured in the device or by the user. Additionally and optionally, the device may provide an indication of recording on display 505. For example, the device may indicate on the display "Recording In Progress" as indicated by 520. The mobile communications device may further provide an aural indication such as a periodic tone, or provide other indications that may be configured by the user on the device.

In various embodiments, a method, computer readable product, and wireless communication device is disclosed for enabling a member of a PTT group to receive an indication from at least one other member mobile communication device that a current conversation or talk spurt may be recorded. The member may further record the conversation or talk spurt, or receive the recorded conversation or talk spurt that has been recorded by another device. The member device may then store the recorded conversation or spurt in a local memory for later retrieval or automatic playback. The recordation may be stored at the remote data store 36, group communication server 32, or at any accessible location within the system 10.

Figure 6:
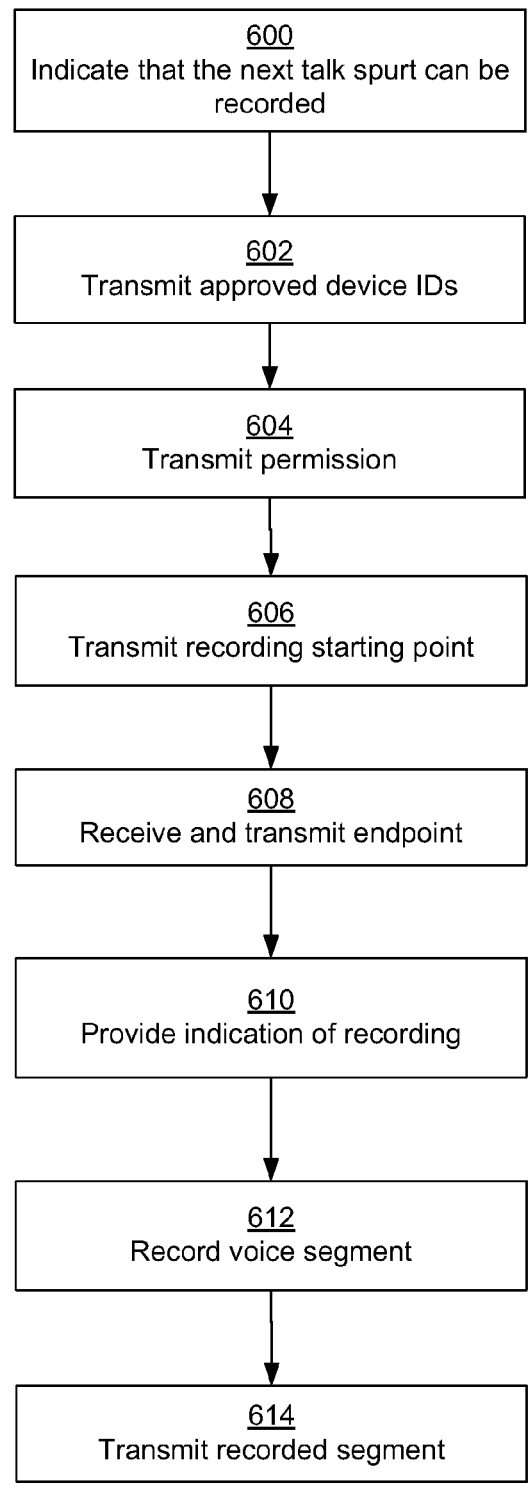
FIG. 6 depicts an exemplary process when the permission to record originates from the talker and is unsolicited by other group members.

As shown in the process of FIG. 6, in one embodiment, a member of a PTT group ("talker") may indicate that a subsequent talk spurt is available for recording by other members of the PTT group 12 ("targets") by pressing the PTT button 78, as shown at operation 600. Thus, the device ID is transmitted, as shown in operation 620 and then permission is sent thereafter, as shown at operation 604. The talker may continue to speak to the PTT group 12, wherein the spoken content may include information that may be desirable for recording. The target devices may hear the PTT voice in real time while the talk spurt is being recorded. The target devices may further be presented the option of recording or saving the talk spurt for later playback as a voice "sticky note." Optionally, the voice sticky note may be allowed to be forwarded to other PTT users or internet portals and stored on a server, such as data store 36.

In various embodiments, the method for recording a talk spurt may further include implicit or explicit permission to record the talk spurt. By enabling the talker to mark a talk spurt as allowable to be saved, the talker may provide implied permission to record the talk spurt. In other embodiments, the talker may provide explicit permission to record the talk spurt.

The recording of a talk spurt may be initiated in a number of ways. For example, a talker may desire to mark a particular point of a conversation as likely to contain important information for recording, such as marking as starting point, as shown at step 606. Thus, in one embodiment the talker may indicate, using the mobile communication device 14, that the subsequent talk spurt may be recorded. Such an indication may be provided by pressing the PTT button, by pressing a "Mark to record" button, by pressing a soft key assigned as a "mark to record" button, and the like. Such an action may provide an indication to the mobile communication devices in the group that the subsequent talk spurt may be recorded, and that other members of the PTT group may be provided an indication that the subsequent talk spurt may be recorded. The talker may also indicate that a subsequent portion of the current talk spurt may be recorded. That is, while the talker is speaking, and thereby transmitting a talk spurt, the talker may press a "mark to record" button to indicate that the targets may start recording the current talk spurt from the point where the talker pressed the "mark to record" button.

The recording of a talk spurt may be terminated in a number of ways. For example, a talker may desire to mark a particular point of a conversation as the endpoint of the recordable segment, such as shown by the receipt of the endpoint from the user and transmission thereof, as shown at operation 608. In one embodiment the talker may indicate, using the mobile communication device, that the recording of the talk spurt may be terminated. Such an indication may be provided by releasing the PTT button if pressing the PTT button was used to initiate the recording. Alternatively, the recording may be terminated by pressing an "End Recording" button, or by pressing a soft key assigned as an "end recording" button. Such an action may provide an indication to the mobile communication device that the talk spurt should no longer be recorded, and that other members of the PTT group may be provided an indication that the recording of the talk spurt may be terminated. Where an "end recording" button is used to indicate that the targets should stop recording, the talker may indicate that the targets should stop recording during the current talk spurt. It is not necessary for the talker to permit the targets to continue recording until the end of the talk spurt.

It should be noted that the talker may indicate that multiple portions of a single talk spurt may be recorded by pressing "mark to record" and "end recording" buttons multiple times during the talk spurt. That is, the talker may begin transmitting a talk spurt, then press a "mark to record" button, then press an "end recording" button, then later in the same talk spurt press the "mark to record" button again to indicate that a second portion of the talk spurt may be recorded, and so on.

Thus, in one embodiment, an indication of the recording is also provided at the device, as shown in operation 610 and then the voice segment is recorded, as shown at operation 612. The recorded segment can also be transmitted from the device to other group members, as shown at operation 614. The sending can be through a direct transmission of the record data through the group communication channel(s) or can be done independently therefrom, such as through other voice and/or data traffic channels.

In an embodiment, the talker may choose to indicate that a talk spurt may be recorded, but at a time different from the current time. For example, the user may indicate that the next PTT session should be recorded. Alternatively, the user may indicate that the recording may be initiated at a designated time.

In another embodiment, rather than the talker indicating when the targets may record a talk spurt, the talker may indicate when the targets may not record a talk spurt. In that way, the talker may "redact" portions of his or her talk spurts, or an entire talk spurt.

In another embodiment, the user may specify specific target users within the PTT group. For example, a member of a PTT group may be temporarily absent from the member's device. If the talker determines that a subsequent talk spurt should be made available for later playback by the absent member, the talker may specify that a subsequent talk spurt should be recorded, and moreover should be recorded on the absent member's device. In such a case it may be useful for the devices to automatically record a talk spurt when the talker has provided indication that the talk spurt may be recorded.

In an embodiment, any member of the PTT group 12 may request that a particular talk spurt be recorded, wherein the requesting member is not the talker of the spurt. For example, the member may desire to make a note of a particular piece of information spoken by the talker and may be temporarily unable to write down the information. The member may request that the talker repeat the information and record the subsequent talk spurt. The request may be indicated in a number of ways. For example, such an indication may be provided by pressing the PTT button 78, by pressing a "request to record" button, by pressing a soft key assigned as a "request to record" button, and the like. Such an action may provide an indication to the mobile communication device 14 to transmit a request that the subsequent talk spurt be recorded. The request may be transmitted to the talker, or in other cases to each member of the PTT group 12. Upon receipt of the request by the talker's device, the talker's device may provide an indication that a request to record has been received. The talker's mobile communication device may request confirmation from the user as to whether the current talk spurt may be recorded. The device may provide on a user display an indication requesting further confirmation from the talker. For example, the device may indicate on the display "Are you sure you want the current conversation to be recorded?" A further press of the PTT, OK, or other button may then indicate that the talker has provided permission to record the current talk spurt.

In various embodiments, the request to record may be generated automatically. A variety of user interactions or device interactions may automatically generate the request. In one embodiment, an automatic request may be generated when a user closes the mobile device during a PTT session. Such an action may indicate that the user is leaving the session and that the user may desire to save the rest of the session available for later playback. In another embodiment, a user may configure a mobile device to automatically generate a request to record when an "End" button is pressed prior to the end of the PTT session.

In various legal jurisdictions, it may be desirable to provide more explicit indication of the talker's agreement to record a talk spurt. Various means may be provided to enable such explicit indication. For example, upon receiving an indication that the talker desires to mark the current conversation for recording, the mobile communication device may request confirmation from the user as to whether the current talk spurt should be recorded. In one embodiment, it may be desirable for the mobile communication device 14 to receive two consecutive button presses before transmitting indications to other devices. In another embodiment, the device may provide on a user display an indication requesting further confirmation from the talker. For example, the device may indicate on the display "Are you sure you want the current conversation to be recorded?" A further press of the PTT, OK, or other button may then indicate that the talker has provided permission to record the current talk spurt. In further embodiments, it may be desirable for each member of the PTT group 12 to provide permission for the talk spurt to be recorded.

The talker may then transmit an indication to each member of the PTT group 12 that the current talk spurt may be recorded. Each member of the PTT group, upon receiving the indication, may further record the conversation or talk spurt. The recording may occur automatically upon receipt of the indication, or upon further indication provided by the target. The target device 14, 16, 18 may not begin recording until the user provides further indication that a recording is desired.

In an embodiment, the target device may provide indication that permission to record the current talk spurt was received. For example, the device may illuminate a button, provide a visual indication on the device's user display, provide an aural indication, or provide other indications that may be configured by the user on the device. The device may further provide on the user display an indication requesting further confirmation from the target. For example, the device may indicate on the display "Are you sure you want to record the current conversation?" A further press of the PTT, OK, or other button may then indicate that the target user has provided permission to record the current talk spurt.

In another embodiment, the talker may be provided the capability to record the talk spurt on the talker's device, and then transmit the recorded talk spurt to one or more member devices. The target devices 14, 16, 18 may initially receive an indication that a recorded talk spurt is available. The target device, upon further indication from the user, may then receive the recorded talk spurt. In other embodiments the target device may automatically receive the recorded talk spurt upon receiving indication of the recorded spurt's availability. The member device may then store the received conversation or spurt in a local memory for later retrieval or automatic playback.

As mentioned, the target device 14, 16, 18, with appropriate permissions, may record a current or subsequent talk spurt. The recording may be implemented with various recording methods such as retaining the as-received message stream representing the voice segment, or decoding the stream and simultaneously reproducing the audio on the device's earpiece as well as retaining the decoded stream. During the time period that a talk spurt is being recorded, the device may further provide indication that the recording is taking place. In various embodiments, the device may illuminate a button, provide a visual indication on the device's user display 80, provide an aural indication, or provide other indications that may be configured by the user on the device. For example, the device may indicate on the display "Recording In Progress."

The recorded talk spurt may be saved locally in a memory 88 of the mobile communication device. By saving the voice locally in the device, the user may be provided immediate access to the recorded talk spurt. The term "aural sticky note" is used to describe such a recorded talk spurt in order to highlight the similarities to physical sticky notes. With a physical sticky note, a person may write a note and physically attach the note to an appropriate object in the recipient's vicinity such as a desktop or a chair. By analogy, an aural sticky note is an aural recording that resides on the target device and "attaches" to the device. In some embodiments the aural sticky note only resides on the target device or devices. The target user does not have to retrieve the aural sticky note on a server (data store 36). Furthermore, once the target user listens to and deletes the aural sticky note, the note may be deleted from the target device and may no longer be available from any other source.

While the talk spurt is being recorded, the talker may continue to speak to the PTT group 12, wherein the spoken content may include information that may be desirable for recording. The target users may continue to listen to the talker's PTT voice in real time while the talk spurt is being record on the target device. In an embodiment, upon completion of recording, the user may be presented with the option of playing the sticky note immediately, or saving the note for later playback. The options may be provided to the user immediately upon completion of the recording, or the options may be provided upon completion of the PTT session.

In a further embodiment, the user may be provided a further option to forward the voice sticky note to another PTT user. In this case the aural sticky note may be treated as a media entity and may be forwarded in a manner similar to forwarding a photo or other type of media file. Alternatively, the user may be provided the option of forwarding the aural sticky note to another location for saving. For example, the note may be forward to an internet portal and stored on a server (such as data store 36).

The aural sticky note may be reproduced and played on the mobile communication device. The playing of the sticky note may be triggered by various actions. In one embodiment, a device that holds at least one aural sticky note associated with the device may automatically play the sticky note when the mobile device is opened, in cases where the device is a flip phone type of device. Other activation actions such as sliding open a keyboard protector, or pressing any button to change the current device state from an "inactive" state to and "active" state may trigger the playing of the sticky note. In other embodiments, the device may provide indication on its user interface that an aural sticky note is available. An LED indicator or other visual indication may be provided. In one embodiment a portion of the display 80 may indicate that a sticky note is available, for example by displaying "New Sticky Note."

Figure 7:
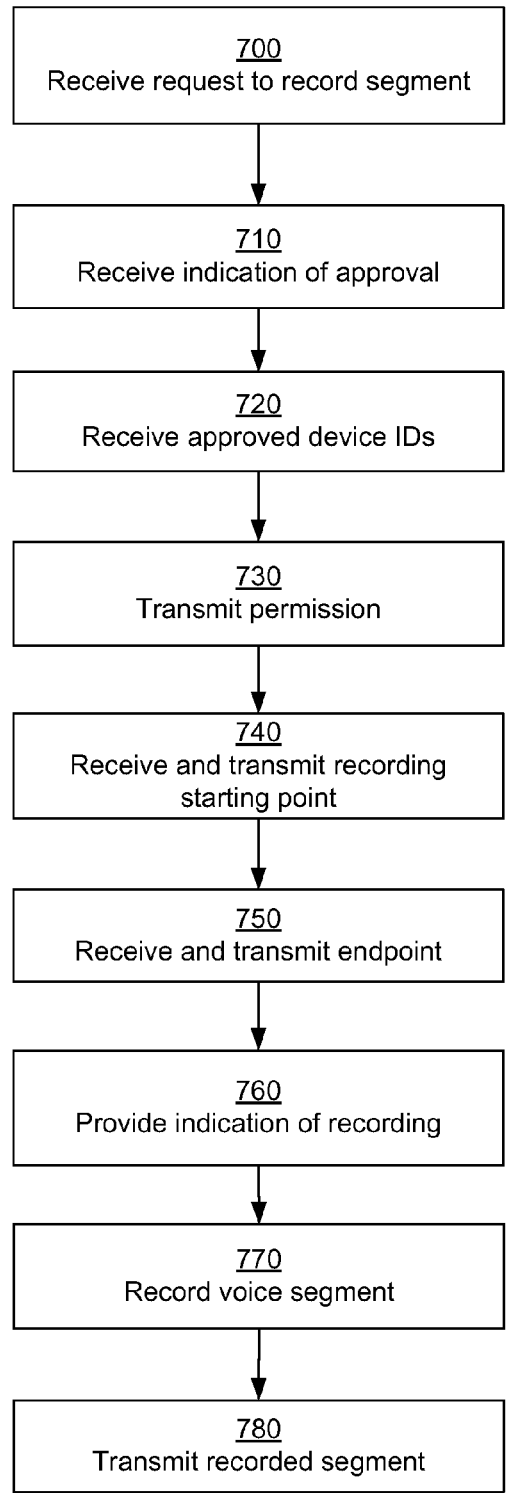
FIG. 7 depicts an exemplary process incorporating some of the embodiments disclosed herein.

FIG. 7 is a flowchart of one embodiment of a method for recording voice data transmissions between mobile communication devices, from the perspective of a device associated with the talker of the voice transmission. A request to record a subsequent voice transmission segment may be received in operation 700. An indication may be provided to the current talker that a request has been received. An indication of approval may be received by the device in operation 710. Optionally, as shown in operation 720, the device may further receive indications of specific devices within a PTT group that the talker may designate as devices authorized to record the voice segment. Alternatively, all members of the PTT group may be provided permission to record the voice segment. In operation 730 the appropriate permissions may be transmitted to the entire group or to selected devices.

In some embodiments a starting point for recording may be received in operation 740 and transmitted to one or more devices in the PTT group 12. The talker may use one or more keys on the device to indicate that recording may commence. In various embodiments a dedicated recording key may be provided on the device, or a software key may be assigned as a "start to record" key. Alternatively, pressing an existing key such as "OK" or "PTT" may indicate that recording may commence. Optionally, the "OK" or "PTT" may be pressed continuously to record the voice segment, and released to indicate that the recording should terminate. In one embodiment the recording may begin automatically at the time the talker indicates permission to record the voice segment. In other embodiments, the recording may commence upon expiration of a predetermined delay.

In some embodiments an endpoint may be received in operation 750 and transmitted to one or more devices in the communications group. The endpoint may indicate that the recording should terminate, or indicate a time at which the recording should terminate. The talker may use one or more keys on the device to indicate that recording should terminate. In various embodiments a dedicated recording key may be provided on the device, which when pressed after previously being used to initiate a recording, may now indicate that the recording should terminate. Alternatively, a software key may be assigned as a "stop recording" key. In other embodiments, pressing an existing key such as "OK" or "PTT" may indicate that recording should terminate after previously having been used to initiate a recording. In one embodiment, if the "OK" or "PTT" is pressed continuously to record the voice segment, the "OK" or "PTT" button may be released to indicate that the recording should terminate.

In operation 760 the mobile communication device 14 may provide an indication that a voice segment is being recorded. During the time that a talk spurt is being recorded, the device may illuminate a button, provide a visual indication on the device's user display, provide an aural indication, or provide other indications that may be configured by the user on the device. For example, the device may indicate on the display "Recording In Progress." The device may further provide an indication to the talker of which targets are recording the voice segment.

In operation 770 the device may record the voice segment. The recording may be implemented with various recording methods such as retaining the as-received message stream, or decoding the stream and simultaneously reproducing the audio on the device's earpiece as well as retaining the decoded stream. The recorded talk spurt may be saved locally in a memory of the mobile communication device. At 780, the user may additionally be provided an option to forward the recorded voice segment, or voice sticky note, to another PTT user.

In an embodiment, if a target does not record a voice segment, or even the whole conversation, that target may later fetch the voice segment or conversation from a server. For instance, while a group communication is in progress and the group arbitrator/moderator or one or more participants have enabled recording of the conversation (or portion thereof), a given target might miss recording the conversation or portion thereof. In such cases, group communication server 32 is aware of the recording permission from the group arbitrator/moderator or the group participant. Group communication server 32 can use data store 36 to buffer the conversation or portion thereof from the point the group arbitrator/moderator or talker enables recording permission. This buffered content would then be available to all participants who have been granted recording permissions for the conversation or portion thereof.

In an embodiment, the target participants can view the recording permission notifications on their respective devices and the timeline/timestamp at which the recording permission was granted.

In an embodiment, a given target may be aware of the start point and endpoint for recording the conversation (or portion thereof) but may have recorded less of the conversation or portion thereof than it was permitted. The target may wish to have more of the conversation or portion thereof recorded, rather than just the portion the target actually recorded. In that case, the target would be able to retrieve the unrecorded, but authorized to be recorded, portion of the conversation from the group communication server 32.

Specifically, the target can specify a start point and/or an endpoint within the recordable conversation or portion thereof indicating which portion of a recorded voice segment to fetch from group communication server 32. Once that portion of the voice segment is downloaded to the target, the portion of the conversation recorded at the target is augmented with the recording from the server to create a new, expanded voice note within the permissible scope of the recording. For example, if a conversation is permitted to be recorded from a start time t1 to an end time t2, but a target only records from time t1' to time t2', the target could request that group communication server 32 send it the voice segment(s) from time t1 to time t1' and/or time t2' to time t2. Once received at the target, the target would add the voice segment from time t1 to time t1' and/or time t2' to time t2 to its locally recorded voice segment(s) from time t1' to time t2'.

Figure 8A:
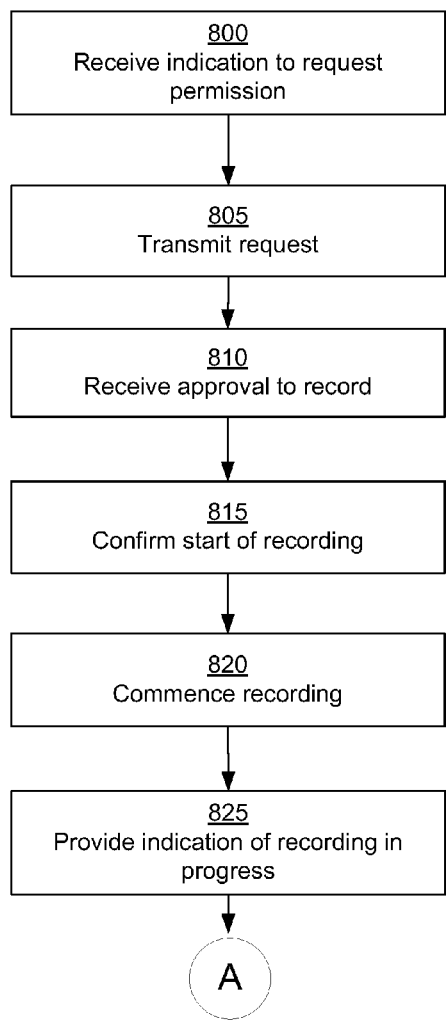
FIGS. 8A and 8B depict an exemplary process incorporating some of the embodiments disclosed herein.

FIG. 8A is a flowchart of one embodiment of a method for recording voice data transmissions between mobile communication devices, from the perspective of a device associated with a participant of a PTT group 12 that records the voice transmission. A request to record a subsequent voice transmission segment may be received in operation 800. The device may transmit the request to one or more members of the PTT group in operation 805. An indication of approval may be received by the device in operation 810. In various embodiments, the device may further receive indications of approval only from a device associated with a user who is currently speaking. In other embodiments, one or more devices within a PTT group may receive permission to record the voice segment.

In operation 815, a device that has received permission may indicate to the user that permission has been received. The device may illuminate a button, provide a visual indication on the device's user display, provide an aural indication, or provide other indications that may be configured by the user on the device. The user may use one or more keys on the device to indicate that recording may commence. In various embodiments a dedicated recording key may be provided on the device to indicate that the recording may commence. Alternatively, a software key may be assigned as a "start recording" key. In other embodiments, pressing an existing key such as "OK" or "PTT" may indicate that recording may commence. In one embodiment, the "OK" or "PTT" button may be pressed continuously to record the voice segment.

In some embodiments the recording may begin automatically at the time the talker indicates approval to record the voice segment. In other embodiments, the recording may commence upon expiration of a predetermined delay.

In operation 820 the mobile communication device may commence recording the voice transmission segment. The recording may be implemented with various recording methods such as retaining the as-received message stream, or decoding the stream and simultaneously reproducing the audio on the device's earpiece as well as retaining the decoded stream.

In operation 825 the device may provide an indication that a voice segment is being recorded. During the time that a talk spurt is being recorded, the device may illuminate a button, provide a visual indication on the device's user display, provide an aural indication, or provide other indications that may be configured by the user on the device. For example, the device may indicate on the display "Recording In Progress."

Figure 8B:
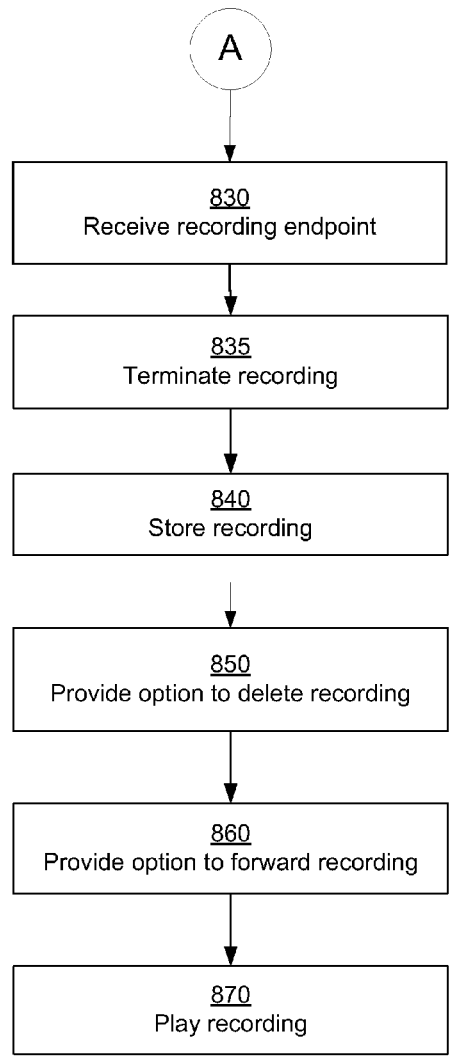

Referring now to FIG. 8B, in some embodiments, an endpoint may be received in operation 830. The endpoint may indicate that the recording may terminate, or indicate a time at which the recording may terminate. The user may use one or more keys on the device to indicate that recording may terminate. In various embodiments a dedicated recording key may be provided on the device, which when pressed after previously having been used to initiate a recording, may now indicate that the recording should terminate. Alternatively, a software key may be assigned as a "stop recording" key. Alternatively, pressing an existing key such as "OK" or "PTT" may indicate that recording should terminate after previously having been used to initiate a recording. In one embodiment, if the "OK" or "PTT" is pressed continuously to record the voice segment, the "OK" or "PTT" button may be released to indicate that the recording should terminate.

In operation 835 the device may terminate the recording. In operation 840 the recording may be stored in a local memory of the device. However, in some embodiments the voice data may be stored as the voice transmission is recorded, and further storing action may not be necessary. In operation 850 the user may be provided an option to delete the recording. The option may be provided at various points of the conversation. For example, the user may be provided the option to delete upon terminating the recording process. In other embodiments the voice sticky note may be played at a later time and the user may be provided an option to delete during or after the sticky note is played. Alternatively, the talker may set the time at which the recording should be deleted.

In yet another embodiment, the talker may rescind the approval to record the talk spurt either during the recording of the talk spurt or after. Accordingly, the received endpoint would be an indication that approval to record the talk spurt has been revoked. If the talk spurt has already been recorded, then the indication would include an identification of the previous talk spurt, and the target would automatically delete the identified recording. If the talk spurt is still in progress, the target device would automatically terminate the recording and delete whatever portion thereof had already been stored.

In operation 860 the user may additionally be provided an option to forward the recorded voice segment, or voice sticky note, to another PTT user, or to a server or other destination.

In operation 870, the recorded voice segment may be reproduced and played on the mobile communication device. As discussed above, the playing of the sticky note may be triggered by various actions. In one embodiment, a device that has at least one aural sticky note associated with the device may automatically play the sticky note when the mobile device is opened, in cases where the device is a flip phone. Other activation actions such as sliding open a keyboard protector, or pressing any button to change the current device state from "inactive" to "active" may trigger the playing of the sticky note.

In another embodiment of the invention, a moderator may control the recording of a group call, such as a conference call or a moderator-controlled PTT group call. All participants of the group call would give the moderator permission to record the call, and the moderator would decide which portions of the call to record. The participants could provide permission in whatever way is appropriate under the circumstances. For example, oral permission may be sufficient, or written permission may be required. Alternatively, permission may be implied by a participant calling-in to the group call, or may be an explicit part of the calling-in process.

When the moderator decides that a portion of a talk spurt or group call should be recorded, the moderator may transmit an indication to the participants that they may record the call until they receive an indication to stop recording, similar to 606, 608, 740, and/or 750. This may give the participants the option to record, or it may cause them to record and stop recording automatically. Alternatively, the moderator may transmit the indications to record and stop recording to a server, and after the call, provide a link to the recording to the call participants. In another alternative, the moderator may record the call locally, and transmit the recording to the participants over network 20.

Typically, when a group communication server, such as group communication server 32, receives packets of audio and/or video data from the participants of a group call, it mixes the received data into a single stream of packet data, which it sends to each participant. The stream may then be record as described above. However, one or more group call participants may not wish to be recorded. In that case, the group communication server may perform one of two alternatives. In the first alternative, the group communication server generates two streams of packet data. One is for playing out at each participant's device, and contains the combined audio and/or video data received from each participant. The second stream contains only the audio and/or video data from participants that have given permission to be recorded. The group communication server sends this stream to the call participants to record locally, or to some other remote recording device.

In the second alternative, the group communication server transmits the stream of packet data containing the combined audio and/or video data received from each participant. However, the stream also includes indications of which participants, or which data segments, may or may not be recorded by the target devices. The target devices will automatically be prevented from recording participants who have not given permission to be recorded, or who have explicitly denied authorization to be recorded.

Figure 9:
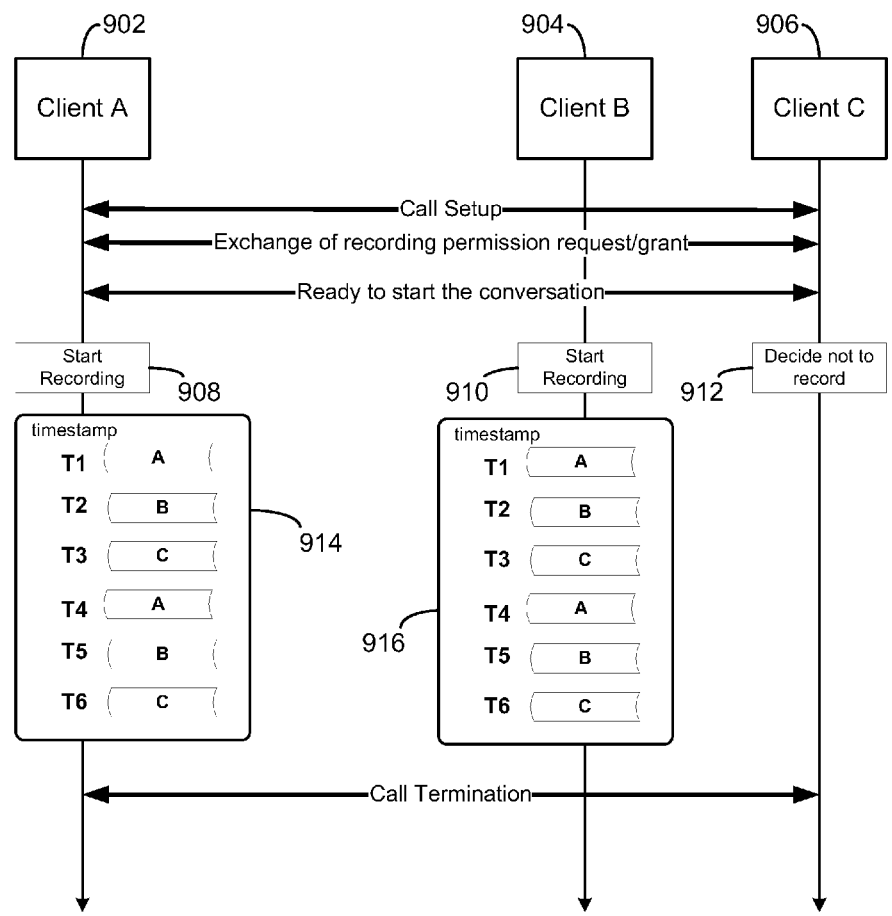
FIG. 9 is an exemplary process of an embodiment that allows the storage and replay of chunks of PTT voice data.

FIG. 9 is an exemplary call-flow process of an embodiment that allows the storage and replay of chunks of PTT voice data between PTT call participants Client A 902, Client B 904 and Client C 906. The PTT call is setup between the clients and the exchange of permission notice/grant requests is performed, and the conversation, typically in talk-spurts, will commence. Client A 902 desires to start recording the talk spurts, as shown at step 908, and Client B 904 desires to record the conversations as well, as shown at step 910. Conversely, Client C does not wish to record the PTT conversations, as shown at step 912, and thus, Client C 906 will participate in the PTT communications as usual. Alternatively, Client A 902 and/or Client B 904 may have denied Client C 906 approval to record the conversation during the exchange of permissions.

Once the talk-spurts commence, Client A 902 begins a timestamp recording 914 and Client B likewise begins a timestamp recording 916, grouping the talk-spurts, or portions thereof, in various "chunks" such as T1, T2, etc. The chunks in the timestamp 914 of Client A 902 and timestamp 916 of Client B 904 accordingly will match in this embodiment. Thus, Client A 902 could refer to chunk T4 on timestamp recording 914 and Client B 904 will be able to identify the same T4 chunk on timestamp recording 916. Alternately, each client device could have its own timestamp criteria for PTT talk-spurts. In this embodiment, the verbal PTT conversation is displayed as each "chunk" of spoken audio in chronological order and can be differentiated to the user through different visual numbers, colors, position on a display, the first phrase of the chunk as determined by a speech recognizer, or the combination of several methods. After the PTT conversations are over, the PTT call terminates.

During the call, Client A 902, Client B 904, and Client C 906 may display various status indicators regarding the call. Each client may display an indication of which clients are permitted to record the call, a particular talk spurt, or a portion of a talk spurt, and which clients are recording them. For example, Client A 902 may display an indication that Client C 906 is not recording and/or is prohibited from recording, and that Client B 904 is recording. Likewise, Client B 904 may display an indication that Client C 906 is not recording and/or is prohibited from recording, and that Client A 902 is recording.

Further, each of Client A 902, Client B 904, and Client C 906 may display an indicator of which portion(s) of the call it has recorded. The indicator may be a progress bar of the call, with recorded portions shown as green and unrecorded portions as red, for example. The indicator could also be incorporated into timestamp recording 914 and timestamp recording 916. In that case, as an example, chunks of the call such as T1, T2, etc. could indicate each talk spurt of the call, and recorded chunks could be green and unrecorded chunks could be red. Where only a portion of the talk spurt indicated by a chunk has been recorded, that portion of the chunk could be green and the rest red. Since Client C 906 is not recording or has not been permitted to record, the indicator of which portion(s) of the call it has recorded would be gray, for example, indicating that it is not recording.

Thus, Client A 902 and Client B 904 are able to click on an audio "chunk" to replay it with the ability to scroll back in time to view older audio from the same conversation. In one embodiment, the clients can save specific audio "chunks", such as T1, and forward the selected audio chunks—either their own audio or the audio of another—to another user or wireless communication device. This embodiment therefore gives the PTT the ability to archive an entire conversational exchange of a PTT communication session.

In view of the methods being executable on a mobile device and other computer platforms, the method can accordingly be performed by a program resident in a computer readable medium, where the program directs the mobile device or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In one or more exemplary embodiments, the functions described may be implemented in hardware, software, firmware, or any combination thereof or other physical embodiment of logic. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other physical data storage media such as optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed is:

1. A method of recording voice data transmissions between mobile communication devices, comprising:
receiving at a first mobile communication device an indication that a subsequent voice transmission segment may or may not be recorded by at least one other mobile communication device, wherein the first mobile communication device and the at least one other mobile communication device are members of a communication group of mobile communication devices that each permit users operating the mobile communication devices to communicate with each other in direct group communication across a wireless communication network; and when the received indication is that the subsequent voice transmission segment may not be recorded by the at least one other mobile communication device, transmitting from the first mobile communication device an indication to the at least one other mobile communication device that the subsequent voice transmission segment may not be recorded.

2. The method of claim 1, further comprising:
receiving an indication identifying an endpoint of the subsequent voice transmission segment; and
transmitting the indication identifying the endpoint to the at least one other mobile communication device.

3. The method of claim 2, wherein the direct group communication is a Push-To-Talk (PTT) group call and wherein the endpoint of said subsequent voice transmission segment corresponds to a point in time before an end of a PTT talk spurt.

4. The method of claim 1, wherein said transmitting further comprises transmitting an indication identifying a starting point for said subsequent voice transmission segment, wherein the starting point is a time different from a current time.

5. The method of claim 4, wherein the direct group communication is a Push-To-Talk (PTT) group call and wherein the starting point of said subsequent voice transmission segment corresponds to a point in time after a start of a PTT talk spurt.

6. The method of claim 1, wherein said transmitting comprises transmitting the indication that the subsequent voice transmission segment may not be recorded to each member of the communication group of mobile communication devices.

7. The method of claim 1, further comprising providing a user an option to designate one or more devices for receiving the indication that the subsequent voice transmission segment may not be recorded.

8. The method of claim 1, wherein said transmitting comprises transmitting the indication that the subsequent voice transmission segment may not be recorded to one or more devices designated by a user.

9. The method of claim 1, wherein the received indication that the subsequent voice transmission segment may or may not be recorded is generated when a Push-To-Talk (PTT) button is pressed.

10. The method of claim 9, wherein an indication identifying an endpoint of the subsequent voice transmission segment is generated when the PTT button is released.

11. The method of claim 1, further comprising:
recording at least a portion of the subsequent voice transmission segment; and
storing the recorded portion of the subsequent voice transmission segment.

12. The method of claim 1, further comprising providing an indication that a current conversation may or may not be recorded.

13. The method of claim 1, further comprising receiving, from said at least one other mobile communication device, a request to record the subsequent voice transmission segment.

14. The method of claim 1, further comprising:
when the received indication is that the subsequent voice transmission segment may be recorded by the at least one other mobile communication device, transmitting from the first mobile communication device an indication that the subsequent voice transmission segment may be recorded to the at least one other mobile communication device;

receiving an indication revoking the received indication that the subsequent voice transmission segment may be recorded; and
transmitting an indication to the at least one other mobile communication device revoking the transmitted indication that the subsequent voice transmission segment may be recorded.

15. The method of claim 14, wherein the at least one other mobile communication device, upon receiving the transmitted indication revoking the transmitted indication that the subsequent voice transmission segment may be recorded, one or more of ceases recording the subsequent voice transmission segment or deletes a recording of the subsequent voice transmission segment.

16. The method of claim 14, wherein a server brokering the direct group communication between the communication group of mobile communication devices, upon receiving the transmitted indication revoking the transmitted indication that the subsequent voice transmission segment may be recorded, one or more of ceases recording the subsequent voice transmission segment or deletes a recording of the subsequent voice transmission segment.

17. The method of claim 1, wherein the first mobile communication device is operated by a moderator of a group call, and wherein the moderator has received permission from all participants of the group call to transmit the transmitted indication that the subsequent voice transmission segment may not be recorded.

18. The method of claim 1, further comprising:
receiving an indication of which of the members of the communication group of mobile communication devices are recording the subsequent voice transmission segment.

19. The method of claim 1, further comprising:
displaying on a user interface of the first mobile communication device an indication of which of the members of the communication group of mobile communication devices are recording the subsequent voice transmission segment.

20. The method of claim 1, wherein the received indication indicates whether other participants of a group call may or may not record subsequent voice transmission segments.

21. The method of claim 20, wherein a server brokering the group call transmits a first stream of the group call comprising voice transmission segments of each participant of the group call; and
wherein the server transmits a second stream of the group call comprising the voice transmission segments of only those participants of the group call that have provided an indication that the other participants of the group call may record the subsequent voice transmission segments.

22. The method of claim 21, wherein the server transmits the first stream to each participant of the group call and transmits the second stream to a recording device.

23. The method of claim 1, wherein if the at least one other mobile communication device does not record the subsequent voice transmission segment, the at least one other mobile communication device may download a recording of the subsequent voice transmission segment from a group communication server.

24. A method of recording voice data transmissions between mobile communication devices, comprising:
receiving at a mobile communication device an indication from at least one other mobile communication device that a subsequent voice transmission segment may or may not be recorded by the mobile communication device, wherein the mobile communication device and the at least one other mobile communication device are members of a communication group of mobile communication devices that each permit users operating the mobile communication devices to communicate with each other in direct group communication across a wireless communication network; and if the received indication indicates that the subsequent voice transmission segment may not be recorded, preventing the subsequent voice transmission segment from being recorded.

25. The method of claim 24, further comprising receiving an indication identifying a starting point of the subsequent voice transmission segment.

26. The method of claim 25, wherein the direct group communication is a Push-To-Talk (PTT) group call and wherein the starting point of the subsequent voice transmission segment corresponds to a point in time after a start of a PTT talk spurt.

27. The method of claim 24, further comprising storing multiple recorded portions of voice transmission segments on a list such that the multiple recorded portions are identifiable as to when the multiple recorded portions occurred.

28. The method of claim 27, wherein the multiple recorded portions are each displayed with a corresponding timestamp.

29. The method of claim 27, wherein the multiple recorded portions are distinguished from each other by different visual numbers, different colors, different positions on a display, or any combination thereof.

30. The method of claim 24, further comprising:
receiving an indication to request permission to record the subsequent voice transmission segment; and
transmitting a request to record the subsequent voice transmission segment.

31. The method of claim 24, further comprising:
recording at least a portion of the subsequent voice transmission segment if the received indication indicates that the subsequent voice transmission segment may be recorded;
storing the recorded portion of the subsequent voice transmission segment in a memory associated with said mobile communication device;
receiving an indication revoking the received indication that the subsequent voice transmission segment may be recorded; and
ceasing to record the subsequent voice transmission segment.

32. The method of claim 24, further comprising:
recording at least a portion of the subsequent voice transmission segment if the received indication indicates that the subsequent voice transmission segment may be recorded;
storing the recorded portion of the subsequent voice transmission segment in a memory associated with said mobile communication device;
receiving an indication revoking the received indication that the subsequent voice transmission segment may be recorded; and
deleting the recorded portion of the subsequent voice transmission segment.

33. The method of claim 24, further comprising:
transmitting an authorization to a moderator of a group call comprising the members of the communication group of mobile communication devices to record voice transmission segments originating at the mobile communication device.

34. The method of claim 24, further comprising:
displaying on a user interface of the mobile communication device an indication of which of the members of the communication group of mobile communication devices are recording the subsequent voice transmission segment.

35. The method of claim 34, further comprising:
displaying on the user interface of the mobile communication device an indication of which portions of the subsequent voice transmission segment have been recorded by each member of the communication group of mobile communication devices.

36. The method of claim 34, further comprising:
displaying on the user interface of the mobile communication device an indication of which portions of the direct group communication have been recorded by each of the members of the communication group of mobile communication devices.

37. The method of claim 24, further comprising:
recording at least a portion of the subsequent voice transmission segment if the received indication indicates that the subsequent voice transmission segment may be recorded; and
storing the recorded portion of the subsequent voice transmission segment in a memory associated with the mobile communication device.

38. The method of claim 37, further comprising receiving an indication identifying an endpoint of the subsequent voice transmission segment.

39. The method of claim 38, further comprising terminating said recording at a time corresponding to said endpoint.

40. The method of claim 38, wherein the direct group communication is a Push-To-Talk (PTT) group call and wherein the endpoint of the subsequent voice transmission segment corresponds to a point in time before an end of a PTT talk spurt.

41. The method of claim 37, further comprising providing an indication that the subsequent voice transmission segment is being recorded.

42. The method of claim 41, wherein the providing the indication comprises providing the indication to the at least one other mobile communication device.

43. The method of claim 37, further comprising:
providing an indication on a user interface of said mobile communication device soliciting input whether the subsequent voice transmission segment should be recorded, wherein the recording and storing steps are executed upon receiving an indication to record the subsequent voice transmission segment.

44. The method of claim 37, further comprising forwarding the recorded subsequent voice transmission segment to another destination.

45. The method of claim 37, wherein the recording is performed while the subsequent voice transmission segment is reproduced on the mobile communication device.

46. The method of claim 37, further comprising providing an option to delete the recorded portion of the subsequent voice transmission segment.

47. The method of claim 37, further comprising:
receiving an indication to record the subsequent voice transmission segment; and
transmitting a request to record the subsequent voice transmission segment to each member of the communication group of mobile communication devices, wherein the recording and storing steps are executed upon receiving permission, from each member of the communication group of mobile communication devices, to record the subsequent voice transmission segment.

48. The method of claim 47, wherein the indication to record the subsequent voice transmission segment is generated by closing the mobile communication device.

49. The method of claim 37, further comprising automatically playing the stored recorded portion of the subsequent voice transmission segment when the mobile communication device is opened or activated.

50. The method of claim 37, wherein the recorded portion of the subsequent voice transmission segment is less than the subsequent voice transmission segment.

51. The method of claim 50, further comprising:
requesting transmission of an unrecorded portion of the subsequent voice transmission segment from a group communication server; and
augmenting the recorded portion of the subsequent voice transmission segment with the requested unrecorded portion of the subsequent voice transmission segment.

52. An apparatus for recording voice data transmissions between mobile communication devices, comprising:
logic configured to receive at a first mobile communication device an indication that a subsequent voice transmission segment may or may not be recorded by at least one other mobile communication device, wherein the first mobile communication device and the at least one other mobile communication device are members of a communication group of mobile communication devices that each permit users operating the mobile communication devices to communicate with each other in direct group communication across a wireless communication network; and
logic configured to transmit from the first mobile communication device an indication to the at least one other mobile communication device that the subsequent voice transmission segment may not be recorded when the received indication is that the subsequent voice transmission segment may not be recorded by the at least one other mobile communication device.

53. An apparatus for recording voice data transmissions between mobile communication devices, comprising:
logic configured to receive, at a mobile communication device, an indication from at least one other mobile communication device that a subsequent voice transmission segment may or may not be recorded by the mobile communication device, wherein the mobile communication device and the at least one other mobile communication device are members of a communication group of mobile communication devices that each permit users operating the mobile communication devices to communicate with each other in direct group communication across a wireless communication network; and
logic configured to prevent the subsequent voice transmission segment from being recorded if the received indication indicates that the subsequent voice transmission segment may not be recorded.

54. An apparatus for recording voice data transmissions between mobile communication devices, comprising:
means for receiving at a first mobile communication device an indication that a subsequent voice transmission segment may or may not be recorded by at least one other mobile communication device, wherein the first mobile communication device and the at least one other mobile communication device are members of a communication group of mobile communication devices that each permit users operating the mobile communication devices to communicate with each other in direct group communication across a wireless communication network; and
means for transmitting from the first mobile communication device an indication to the at least one other mobile communication device that the subsequent voice transmission segment may not be recorded when the received indication is that the subsequent voice transmission segment may not be recorded by the at least one other mobile communication device.

55. An apparatus for recording voice data transmissions between mobile communication devices, comprising:
means for receiving, at a mobile communication device, an indication from at least one other mobile communication device that a subsequent voice transmission segment may or may not be recorded by the mobile communication device, wherein the mobile communication device and the at least one other mobile communication device are members of a communication group of mobile communication devices that each permit users operating the mobile communication devices to communicate with each other in direct group communication across a wireless communication network; and
means for preventing the subsequent voice transmission segment from being recorded the received indication indicates that the subsequent voice transmission segment may not be recorded.

56. A non-transitory computer-readable medium for recording voice data transmissions between mobile communication devices, comprising:
at least one instruction for causing a first mobile communication device to receive an indication that a subsequent voice transmission segment may or may not be recorded by at least one other mobile communication device, wherein the first mobile communication device and the at least one other mobile communication device are members of a communication group of mobile communication devices that each permit users operating the mobile communication devices to communicate with each other in direct group communication across a wireless communication network; and
at least one instruction for causing the first mobile communication device to transmit an indication to the at least one other mobile communication device that the subsequent voice transmission segment may not be recorded when the received indication is that the subsequent voice transmission segment may not be recorded by the at least one other mobile communication device.

57. A non-transitory computer-readable medium for recording voice data transmissions between mobile communication devices, comprising:
at least one instruction for causing a mobile communication device to receive an indication from at least one other mobile communication device that a subsequent voice transmission segment may or may not be recorded by the mobile communication device, wherein the mobile communication device and the at least one other mobile communication device are members of a communication group of mobile communication devices that each permit users operating the mobile communication devices to communicate with each other in direct group communication across a wireless communication network; and
at least one instruction for causing the mobile communication device to prevent the subsequent voice transmission segment from being recorded if the received indication indicates that the subsequent voice transmission segment may not be recorded.

* * * * *